United States Patent
Saurer et al.

(10) Patent No.: US 6,229,766 B1
(45) Date of Patent: *May 8, 2001

(54) DIAL FORMED OF A SOLAR CELL IN PARTICULAR FOR A TIMEPIECE

(75) Inventors: Eric Saurer, Bevaix; Diego Fischer, Neuchâtel, both of (CH)

(73) Assignee: Asulab S.A., Bienne (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/049,477

(22) Filed: Mar. 27, 1998

(30) Foreign Application Priority Data

Apr. 14, 1997 (EP) .................................. 97106061

(51) Int. Cl.⁷ .................................................. G04B 1/00
(52) U.S. Cl. ............................................................ 368/205
(58) Field of Search ............................................ 368/205

(56) References Cited

U.S. PATENT DOCUMENTS 5,438,556 * 8/1995 Dinger et al. ....................... 368/205
5,761,158 * 6/1998 Azuma et al. ....................... 368/205

FOREIGN PATENT DOCUMENTS 0 697 636    2/1996  (EP).
WO96/12989   5/1996  (WO).
WO96/31810  10/1996  (WO).

* cited by examiner

Primary Examiner—Bernard Roskoski
(74) Attorney, Agent, or Firm—Griffin & Szipl, P.C.

(57) ABSTRACT

The invention concerns a dial, in particular for a timepiece, formed of a solar cell including a substrate, at least one plurality of superposed layers defining at least one n-i-p or p-i-n element and a conductive layer forming a first electrode arranged to be exposed to luminous radiation, characterised in that said electrode is formed of a partially reflective metal layer.

13 Claims, 1 Drawing Sheet

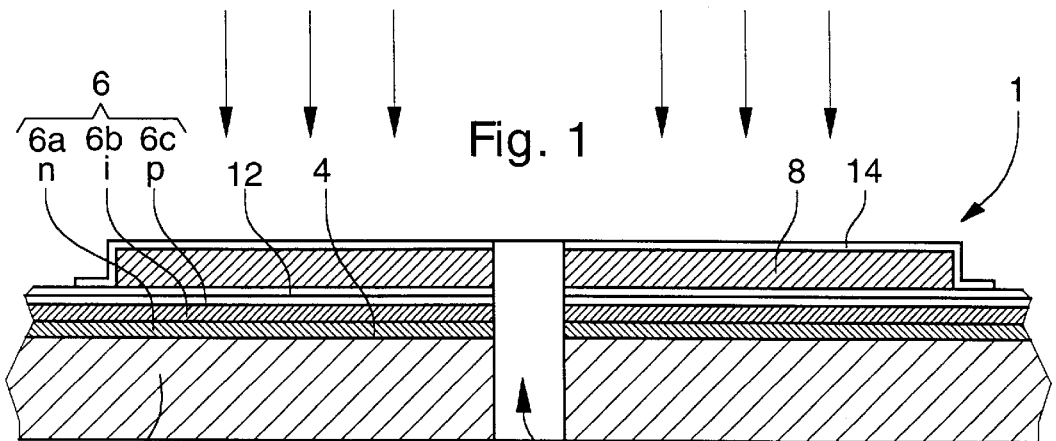
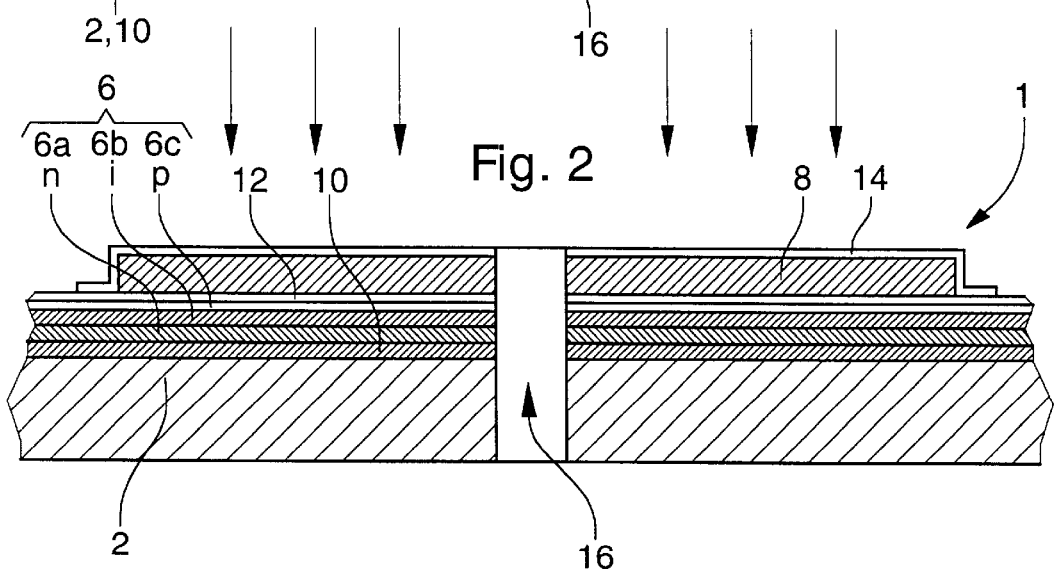
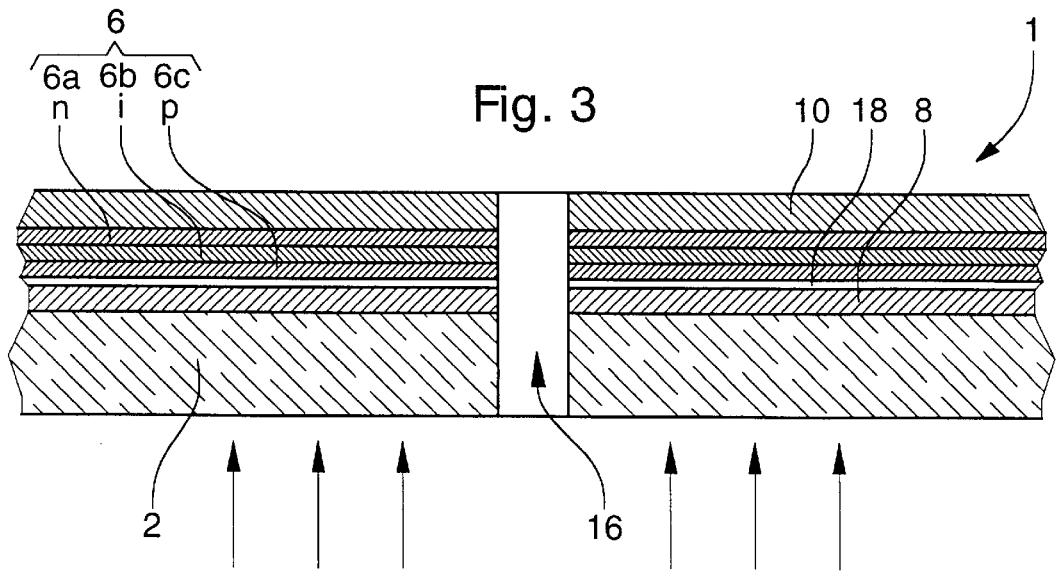

DIAL FORMED OF A SOLAR CELL IN PARTICULAR FOR A TIMEPIECE

The present invention concerns a dial formed of a solar cell and arranged, in particular, to supply a timepiece horometric circuit or an electric circuit for an apparatus such as a measuring apparatus. The invention more particularly concerns a dial wherein the face seen by the user has a metal appearance or aspect.

Timepieces, in particular watches, whose horometric circuit is supplied by one or more a-Si:H/n-i-p or p-i-n amorphous silicon solar cells connected in series are already known. These cells, which use photovoltaic conversion to generate electric power, are generally made on a metal substrate on which an insulating layer, a transparent or opaque inner conductive layer, successive n-i-p amorphous silicon layers and a transparent outer conductive layer are successively deposited. The use of the insulating layer allows the subsequent connection in series of several photovoltaic elements on the same metal substrate. The transparent conductive layers are generally made of indium oxide (ITO) or tin oxide ($SnO_2$) or doped zinc oxide (ZnO). The use of ITO, Sn $O_2$ or ZnO for making the transparent conductive layer has several drawbacks. The ITO layer exposed to light gives way to interference phenomenon which leads to undesirable coloured iridescence on the surface of the dial, in particular in the case of a watch dial. In order to overcome this problem, covering the ITO with lacquer is known, however, this additional layer of lacquer gives a blackish appearance to the dial, which is also unsatisfactory when one wishes to use such a dial for a watch, insofar as the dial interferes in a dominant manner in the ornamental function of the watch. Moreover, the resistivity of ITO is relatively high (in the order of $8\times10^{-4}$ $\Omega$cm), which leads to a significant impedance drop in the cell, in particular when the cell is exposed to light of strong intensity.

Patent Document WO-A-96/12989 attempts to overcome these problems. According to this Document, the dial is formed of a solar cell masked by a translucent ceramic film made of $Al_2O_3$ so that the solar cell is hidden from the user's view. However, this cell's appearance is milky white and consequently unattractive to the consumer. Patent Document WO-A-96/31810 further proposes to modify the appearance of such a dial by adding a coloured layer onto the face of the dial seen by the user. However, the result obtained with this additional transmissive layer remains lustreless and does not allow the aesthetic appearance of the dial to be significantly enhanced.

A principal object of the invention is thus to overcome the drawbacks of the aforementioned prior art by providing a dial fitted with a solar cell which presents an intense brilliance to the user particularly suited to making decorative dials, for example for timepieces, while maintaining acceptable electric capacities for application to the cell used as a power source, with a simple and economic cell structure.

The invention therefore concerns a dial, in particular for a timepiece, formed of a solar cell including a substrate, at least one plurality of superposed layers defining at least one n-i-p or p-i-n element and a conductive layer forming a first electrode arranged to be exposed to luminous radiation or light, characterised in that said electrode is formed of a partially reflective metal layer.

Thus one obtains a dial formed of a solar cell, which has an improved external appearance, insofar as the metal layer reflects a fraction of the incident light and offers an aesthetic metal brilliance while allowing a sufficient fraction of incident light to pass for the photovoltaic effect to occur.

It will be noted that this use of a partially reflecting layer to form the conductive layer exposed to the light goes against the principle currently employed in this field by the man skilled in the art, who tends constantly to make such layers with maximum transmission and to reduce to a minimum any incident light reflection on the conductive layer.

Such a dial also has the advantage of being monolithic and consequently of performing the dual function of dial and source of electric power for a timepiece or suchlike.

According to an advantageous feature of the invention, at a wavelength of 550 nm, the first electrode has light reflectivity comprised between 90% and 50% and preferably between 85% and 60%.

With such reflectivity and weak light, for example 100 lux, and with a silver layer of a thickness of approximately 30 nm, the dial according to the invention can provide a current of the order of 1 $\mu$A or more, which is sufficient to supply the time-keeping circuit of an electronic timepiece.

The partially reflective metal also has a higher conductivity level than ITO which, in the event of exposure to high intensity light, leads to a lower voltage drop in the metal than in ITO.

It will also be noted that this reflectivity easily allows the use of a solar cell to be disguised by giving the dial the appearance of a conventional dial.

According to another preferred feature, the metal of the first electrode is selected from the group comprising gold, aluminium, silver, platinum, palladium, rhodium, nickel, titanium and copper.

These metals have the significant advantage of having sufficient reflection coefficients for the applications in question in the visible wavelengths while having sufficiently high electric conductivity.

Other features and advantages of the invention will appear more clearly upon reading the following description of an embodiment of the invention given purely by way of illustrative and non-limiting example, this description being made in conjunction with the drawings in which:

FIG. 1 is a longitudinal cross-section of a first embodiment of a dial according to the invention;

FIG. 2 is a similar cross-section to that shown in FIG. 1, showing a second embodiment of a dial according to the invention; and FIG. 3 is a similar cross-section to that shown in FIG. 1, showing a third embodiment of a dial according to the invention, the substrate of the dial being transparent and light passing through it.

The description of the invention will be made within the scope of an application to a dial for a timepiece, such as a watch, however, it goes without saying that the invention is in no way limited to this application and that it could advantageously be used within the scope of any other application in low consuming electrical instruments, in particular, portable instruments, including a dial.

With reference first to FIG. 1, a watch dial formed of a solar cell according to the invention and designated by the general reference 1 is shown. The dial is capable of transforming light into an electric current via a process called photoconversion, to supply, via a supply circuit, a time-keeping circuit of the watch. These circuits and their connections (not shown) are well known to the man skilled in the art and will consequently not be described in more detail here. For a detailed description of the phenomenon of photoconversion reference should be made to the work entitled "Solar photobatteries" by A. Ricaud and published by "Presses polytechniques et universitaires romandes", IBSN 2-88074326-5.

Dial 1 according to the invention includes a substrate 2 formed of a rigid metal plate, for example made of stainless steel. Substrate 2 includes a face 4 on which are deposited a plurality of thin successive n, i, p layers 6a, 6b, 6c. These three layers 6a, 6b and 6c form an elementary solar cell, defining a diode, i.e. an n-i-p junction diode including an intrinsic layer, inserted between an n layer and a p layer, which may be exposed to luminous radiation. Elementary solar cell 6 is formed of three layers of semi-conductor materials having different types of conductivity to constitute the n-i-p diode. Layer 6a of the elementary cell is for example a layer of hydrogenous amorphous silicon (a-Si:H) doped for example with phosphorous to obtain n type conductivity. The thickness of this layer is preferably of the order of 10 to 30 nm. The following layer 6b of elementary cell 6 is an intrinsic i layer which is thicker than the preceding layer and in which a current is photo-generated when the cell is exposed to light. Layer 6b has for example a thickness of the order of 200 to 500 nm. The third layer 6c of elementary cell 6 is doped for example with boron to obtain p type conductivity. The thickness of this layer is preferably of the order of 10 to 20 nm.

In this example, n type layer 6a is the closest to substrate 2.

Layers 6a, 6b and 6c are preferably microcrystalline layers.

In order to connect cell 6 to the supply circuit, the cell further includes a conductive layer forming a first electrode 8 which is disposed above layer 6c and in contact therewith, this electrode 8 being the element of the cell which is arranged to be directly exposed to light. In order to close the electric circuit, elementary cell 6 includes a second conductive layer 10 forming a second electrode which is in contact with layer 6a. In the example shown in FIG. 1, second electrode 10 is formed by conductive substrate 2 itself. If substrate 10 has poor reflectivity, one or more intermediate conductive layers (of oxide (ZnO), or metals) may be inserted between substrate 10 and cell 6 for the purpose of increasing the cell's light absorption.

Of course, in the event that the substrate is made of a non-conductive material as is shown in FIG. 2, for example of plastic, electrode 10 is made by a metal layer preferably having a high level of reflectivity, made, for example, of silver or a silver alloy.

According to the invention, first electrode 8 is formed of a partially reflective layer, which has an incident light reflectivity comprised between 90% and 50% at a wavelength of 550 nm, which allows metallic brilliance, and thus the desired aesthetic appearance, to be obtained for the dial. In order to obtain this reflectivity, one works essentially upon the thickness of the metal of layer 8. The reflectivity of first electrode 8 is comprised between 85% and 60% at a wavelength of 550 nm.

It has also been noted that with a thickness of layer 8 of the order of 20 nm and preferably 35 nm, an elementary cell having a surface of a conventional watch dial (of the order of 5 cm$^2$), allows sufficient light to pass even in low lighting conditions (100 lux) to provide enough electric power to supply a time-keeping circuit of an electronic watch, namely typically an average current of 1 $\mu$A at a voltage of 1.5 V.

Metal layer 8 can be formed of a metal selected from the group including gold, copper, aluminium, silver, platinum, palladium, nickel, titanium and rhodium. Of course, other metals having reflectivity and electric conductivity properties of the same order may also be suitable. One will preferably select metals which, for the desired reflectivities, lead to sheet resistances preferably comprised between 0.5 and 30 Ohms.

By way of example, silver has an optimum specific conductivity/reflectivity ratio particularly well suited to making layer 8.

The deposition of the layer 8 metal can be conventionally achieved by cathodic sputtering, vapor deposition or with an electron gun. This deposition may also be achieved though a mask defining the contours of layer 8.

In order to facilitate the deposition of conductive layer 8, onto p-type layer 6c, an intermediate binder layer 12 may be provided. The thickness of this layer 12 is as thin as possible and typically of the order of 1 nm, in order to allow as much light as possible to pass through it. This binder layer 12 may be made of chromium or titanium.

According to an advantageous alternative, the elementary cell may further include a transparent protective layer 14 extending above first electrode 8, in order, in particular, to protect cell 6 from oxidation and corrosion and any other physical change able for example to occur during manipulation or assembly of dial 1. This layer may be formed for example of a transparent polymer resin such as acrylate, methacrylate, polyvinyl or suchlike, having a thickness of a few $\mu$m.

It will also be noted in this regard that layer 1 covers the edges of first electrode 8, which allows any short-circuiting problem of the first electrode with the second electrode (which is the substrate in the embodiment shown in FIG. 1).

Finally, dial 1 includes a bore 16 situated substantially at its centre to allow passage of the pipes onto which are fixed the hands of the watch to which dial 1 is intended to be fitted. Here also, identical means will be applied to avoid short-circuiting between the layers.

FIG. 3 shows another embodiment of a dial according to the invention, wherein the same elements as those described in connection with FIGS. 1 and 2 have been designated by the same numerical references.

Unlike the embodiments shown in FIGS. 1 and 2, p-type layer 6c is the closest to substrate 2 and the substrate is a transparent substrate, for example made of glass or transparent plastic material. In this embodiment, first electrode 8, i.e. the electrode exposed to the light, is inserted between substrate 2 and layer 6c. A conductive diffusion barrier layer 18 may also be inserted between first electrode 8 and layer 6c in order to prevent any diffusion of the electrode metal into the layers of elementary cell 6 during manufacturing of the dial. Diffusion barrier layer 18 may be formed of zinc oxide (ZnO) or tin oxide (SnO2) and have a thickness comprised between 10 and 500 nm.

It will be noted that substrate 2 may, if so desired, be structured, i.e. have a surface state able to give the dial a diffusing metallic appearance.

What is claimed is:

1. A dial, in particular for a timepiece, formed of a solar cell including a substrate, at least one plurality of superposed layers defining at least one n-i-p or p-i-n element and a conductive layer forming a first electrode arranged to be exposed to light, wherein said electrode is formed of a partially reflective metal layer wherein said first electrode has light reflectivity comprised between 90% and 50% at a wavelength of 550 nm.

2. A dial according to claim 1, wherein said first electrode has light reflectivity comprised between 85% and 60% at a wavelength of 550 nm.

3. A dial according to claim 1, wherein the metal of the first electrode is selected from the group including gold, aluminium, silver, platinum, palladium, nickel, titanium, rhodium and copper.

4. A dial according to claim 1, wherein the first electrode has a minimum thickness comprised between 2 and 10 nm and a maximum thickness comprised between 15 and 40 nm.

5. A dial according to claim 1, wherein a binder layer and/or a diffusion barrier layer is inserted between the first electrode and the p layer.

6. A dial according to claim 1, wherein said element is an n-i-p element and in that the n layer is the closest layer to the substrate.

7. A dial according to claim 6, wherein the substrate is conductive and forms a second electrode of the n-i-p element.

8. A dial according to claim 6, wherein the substrate is insulating and in that a second conductive layer forming a second electrode is inserted between the substrate and the n layer.

9. A dial according to claim 6, wherein the first electrode is covered by a layer of transparent protective lacquer.

10. A dial according to claim 1, wherein said element is a p-i-n element, in that the p layer is the closest layer to the substrate and in that the substrate is transparent.

11. A dial according to claim 10, wherein the substrate is made of glass.

12. A dial according to claim 1, wherein the dial includes a bore arranged for the passage of pipes for hands.

13. A dial according to claim 1, wherein the face of the substrate which carries said n-i-p or p-i-n element is structured.

* * * * *